US008417458B2

(12) United States Patent
Halliday et al.

(10) Patent No.: US 8,417,458 B2
(45) Date of Patent: Apr. 9, 2013

(54) REMOVING GROUND-ROLL FROM GEOPHYSICAL DATA

(75) Inventors: David Fraser Halliday, Fife (GB); Andrew Curtis, Edinburgh (GB)

(73) Assignee: WesternGeco L.L.C., Houston, TX (US)

( * ) Notice: Subject to any disclaimer, the term of this patent is extended or adjusted under 35 U.S.C. 154(b) by 210 days.

(21) Appl. No.: 12/848,534

(22) Filed: Aug. 2, 2010

(65) Prior Publication Data

US 2011/0046886 A1 Feb. 24, 2011

Related U.S. Application Data

(60) Provisional application No. 61/236,000, filed on Aug. 21, 2009.

(51) Int. Cl.
*G01V 1/00* (2006.01)
*G01V 1/28* (2006.01)

(52) U.S. Cl.
USPC ................................ 702/17; 702/13; 702/14

(58) Field of Classification Search .................... 702/14, 702/17, 18
See application file for complete search history.

(56) References Cited

U.S. PATENT DOCUMENTS

| | | | | |
|---|---|---|---|---|
| 6,253,157 | B1 * | 6/2001 | Krebs | 702/18 |
| 6,594,585 | B1 * | 7/2003 | Gersztenkorn | 702/14 |
| 6,989,905 | B2 * | 1/2006 | De Groot | 356/516 |
| 2003/0130796 | A1 * | 7/2003 | Wiggins | 702/14 |
| 2005/0065731 | A1 * | 3/2005 | Mittet | 702/13 |
| 2007/0104028 | A1 * | 5/2007 | Van Manen et al. | 367/38 |

OTHER PUBLICATIONS

Curtis, et al., Virtual Seismometers in the Subsurface of the Earth from Seismic Interferometry, Nature Geoscience, Aug. 30, 2009, p. 1-5, www.nature.com/naturescience.
Halliday, et al., Seismic Interferometry, Surface Waves and Source Distribution, Geophysical Journal International, 2008, pp. 1067-1087, vol. 175.
Halliday, Surface Wave Interferomerty, 2009, Chapter 8, Thesis, University of Edinberg.
Ramirez, et al., The Role of the Direct Wave and Green's Theorem in Seismic Interferometry and Spurious Multiples, 2007, p. 2471-2475., SEG Annual Meeting, San Antonio, TX, US.

* cited by examiner

*Primary Examiner* — Andrew Schechter
*Assistant Examiner* — Ivan Rabovianski (57) ABSTRACT

A method for processing geophysical data. The method includes generating a model from geophysical data acquired at a receiver location and one or more boundary receiver locations. After generating the model, the method applies a forward modeling algorithm using information from the model to generate a modeled estimate of a direct ground roll between the receiver location and each boundary receiver location. The method then estimates a ground roll between a source location and each boundary receiver location. Using the modeled estimate of a direct ground roll between the receiver location and each boundary receiver location and the estimate of the ground roll between a source location and each boundary receiver location, the method applies interferometry between the estimate of the ground roll between the source location and each boundary receiver location and the modeled estimate of the direct ground roll between the receiver location and each boundary receiver location to generate an interferometric estimate of a ground roll between the source location and the receiver location. The method then removes the interferometric estimate of the ground roll between the source location and the receiver location from geophysical data acquired at the receiver location due to a source at the source location.

35 Claims, 4 Drawing Sheets

REMOVING GROUND-ROLL FROM GEOPHYSICAL DATA

CROSS-REFERENCE TO RELATED APPLICATIONS

This application claims benefit of U.S. provisional patent application Ser. No. 61/236,000, filed Aug. 21, 2009, which is incorporated herein by reference.

BACKGROUND

1. Field of the Invention

Implementations of various technologies described herein generally relate to geophysical data processing.

2. Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Seismic exploration is conducted on both land and in water. In both environments, exploration involves surveying subterranean geological formations for hydrocarbon deposits. A survey typically involves deploying acoustic source(s) and acoustic sensors/receivers at predetermined locations. The sources impart acoustic waves into the geological formations. Features of the geological formation reflect the acoustic waves to the sensors. The sensors receive the reflected waves, which are detected, conditioned, and processed to generate seismic data. Analysis of the seismic data can then indicate probable locations of the hydrocarbon deposits.

However, not all of the acoustic waves propagate downward into the geological formation. Some of the acoustic waves are "interface waves" that propagate along an interface between two media instead of through a medium. An interface wave can travel at the interface between the Earth and air—e.g., surface waves—, between the Earth and a body of water—e.g., Scholte waves—, or between a shallow interface within the near-surface of the Earth—e.g., refracted shear waves for instance. Surface waves or seismic waves that propagate laterally through the near surface of the Earth often create a "ground roll" in acquired seismic data. Ground roll is a type of coherent noise generated by a surface wave that can obscure signals reflected from the geological formation and degrade overall quality of the seismic data resulting from the survey. Consequently, most surveys attempt to eliminate, or at least reduce, ground roll. In the following the term "ground roll" will be used in place of surface wave, as is common in the exploration seismology industry.

Techniques for mitigating ground roll include careful selection of source and geophone arrays during the survey and filters and stacking parameters during processing. However, because the ground roll can be heavily (back)scattered by near-surface heterogeneities, conventional frequency and wave number ("FK")-filtering techniques are often unsuccessful: the noise is distributed over a large range of (out-of-plane) wave numbers outside the expected FK-slice in a manner that is difficult to predict without highly detailed knowledge of the near-surface scatterers.

The phenomenon of interface waves is described above in the context of seismic surveying. However, their existence is not limited to that technology. The phenomenon may also be encountered in electromagnetic surveying or non-destructive testing (i.e., geophysical data), for instance. Interface waves raise similar concerns and have similar effects on the efficacy of these technologies as well.

SUMMARY

Described herein are implementations of various technologies for removing ground roll from geophysical data. In one implementation, a method for removing ground roll from geophysical data may include generating a model from geophysical data acquired at a receiver location and one or more boundary receiver locations. After generating the model, the method may apply a forward modeling algorithm using information from the model to generate a modeled estimate of a direct ground roll between the receiver location and each boundary receiver location. The method may then estimate a ground roll between a source location and each boundary receiver location. Using the modeled estimate of a direct ground roll between the receiver location and each boundary receiver location and the estimate of the ground roll between a source location and each boundary receiver location, the method may apply interferometry between the estimate of the ground roll between the source location and each boundary receiver location and the modeled estimate of the direct ground roll between the receiver location and each boundary receiver location to generate an interferometric estimate of a ground roll between the source location and the receiver location. The method may then remove the interferometric estimate of the ground roll between the source location and the receiver location from geophysical data acquired at the receiver location due to a source at the source location.

In another implementation, the method for removing ground roll from geophysical data described above may be performed by estimating a scattered ground roll between a source location and each boundary receiver location instead of estimating the ground roll between the source location and each boundary receiver location. Using the scattered ground roll between the source location and each boundary receiver location, the method may then apply interferometry between the estimate of the scattered ground roll between the source location and each boundary receiver location and the modeled estimate of the direct ground roll between the receiver location and each boundary receiver location to generate an interferometric estimate of a scattered ground roll between the source location and the receiver location. The method may then remove the interferometric estimate of the scattered ground roll between the source location and the receiver location from geophysical data acquired at the receiver location due to a source at the source location.

In yet another implementation, the method for removing ground roll from geophysical data described above may be performed by estimating a direct ground roll between a source location and each boundary receiver location instead of estimating the ground roll between the source location and each boundary receiver location. After estimating the direct ground roll between the source location and each boundary receiver location, the method may then include applying interferometry between the estimate of the direct ground roll between the source location and each boundary receiver location and the estimate of the direct ground roll between the receiver location and each boundary receiver location to generate an interferometric estimate of a direct ground roll between the source location and the receiver location. After generating the interferometric estimate of a direct ground roll between the source location and the receiver location, the method may then include removing the interferometric estimate of the direct ground roll between the source location and the receiver location from geophysical data acquired at the receiver location due to a source at the source location.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at removing ground roll from seismic data. In one implementation, a method for removing ground roll from seismic data may be performed by a computer application. Initially, the computer application may receive seismic data that was acquired from one or more boundary receivers (R) and a specified receiver (R1) inside the boundary receivers in a seismic survey. Using the seismic data received from the receivers, the computer application may generate a velocity model of the earth, for example, that represents the surface wave propagation velocities, or ground roll, of the earth. The computer application may then apply a forward modeling algorithm to the velocity model of the earth to generate a modeled-estimate of the direct ground roll between the specified receiver (R1) and each boundary receiver (R).

Next, the computer application may make a simple estimate of the direct and scattered ground roll between a specified source (S1) located within the boundary receivers and each boundary receiver (R). The simple estimate of ground roll may be obtained using conventional seismic processing techniques such as frequency-wavenumber filtering, bandpass filtering, time windowing and the like. As such, the simple estimate of ground roll may not suppress the body waves within this estimate. In one implementation, the simple estimate of the direct and scattered ground roll between a specified source (S1) located within the boundary receivers and each boundary receiver (R) may be obtained by applying a band pass filter and time window to the seismic data obtained from each boundary receiver (R) due to the source (S1). The computer application may then perform interferometry on the modeled estimate of the direct ground roll between the specified receiver (R1) and each boundary receiver (R) and the simple estimate of the direct and scattered ground roll between the specified source (S1) and each boundary receiver (R). As a result, an interferometric estimate of the ground roll between the specified source (S1) and the specified receiver (R1) may be obtained. The computer application may then remove the interferometric estimate of the ground roll between the specified source (S1) and the specified receiver (R1) from seismic data between the specified source (S1) and the specified receiver (R1), thereby removing the ground roll from the seismic data.

Various techniques for removing ground roll from seismic data will now be described in more detail with reference to FIGS. 1-4 in the following paragraphs.

Figure 1:
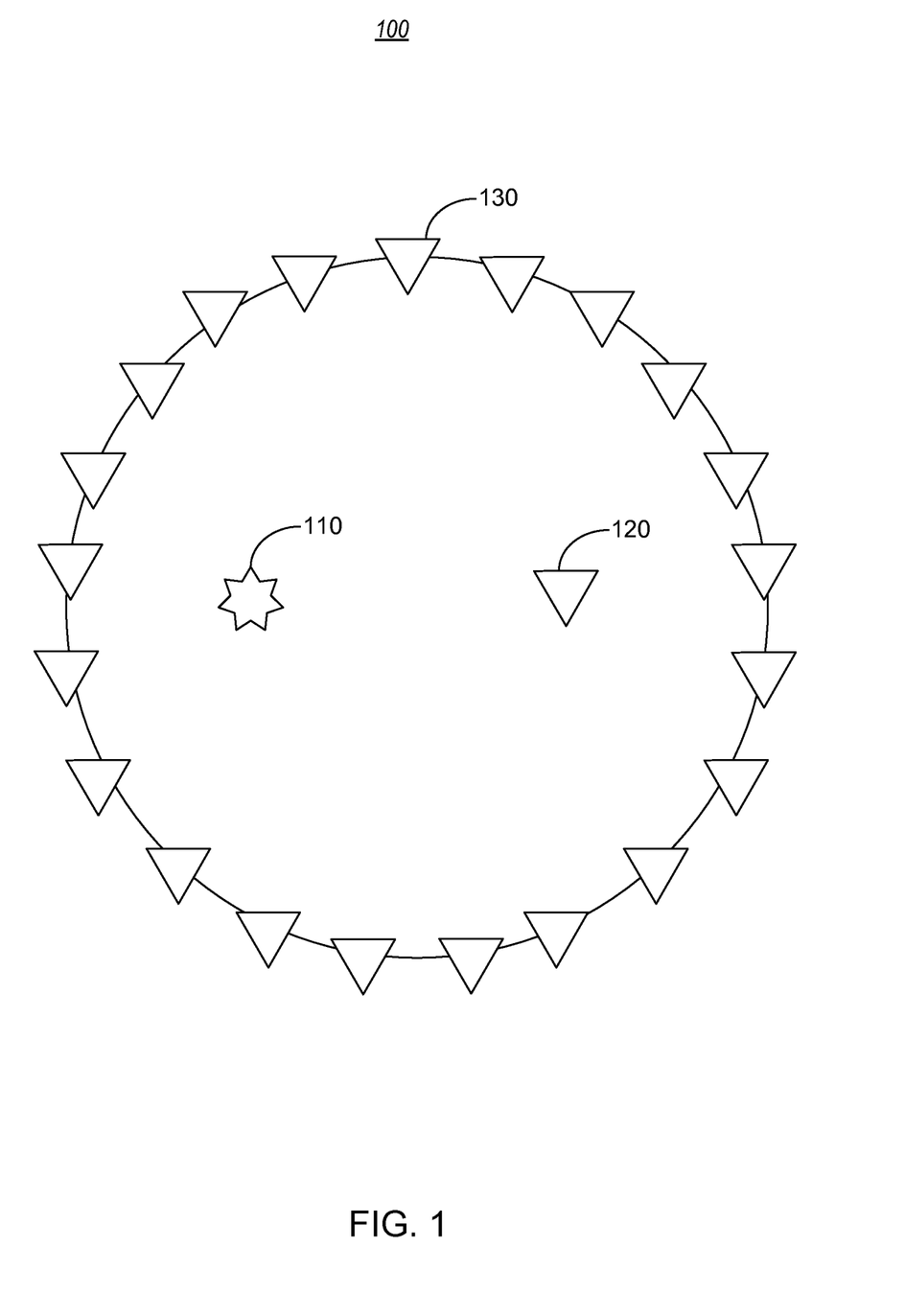
FIGS. 1-2 illustrate schematic diagrams of source and receiver configurations in accordance with implementations of various techniques described herein.

FIG. 1 illustrates a schematic diagram of a source and receiver configuration 100 in accordance with implementations of various techniques described herein. The source and receiver configuration 100 includes a source 110, a receiver 120 and boundary receivers 130. The source 110 may include any type of seismic source such as a vibrator and the like. The receiver 120 and the boundary receivers 130 may include any type of seismic receivers such as a geophone, hydrophone or the like. Although the source and receiver configuration 100 has been illustrated with boundary receivers 130, according to source-receiver reciprocity, the methods described herein may also be applied to a source and receiver configuration having boundary sources located where the boundary receivers 130 are located, a source located where the receiver 120 is located, and a receiver located where the source 110 is located as per the source and receiver configuration 100.

The source and receiver configuration 100 may be installed on the surface of the earth as part of a land seismic survey or on a seabed as part of an ocean bottom seismic survey. The source 110 may generate a plurality of seismic survey signals in accordance with conventional practice. The seismic survey signals may propagate through the surface of the earth to a geological formation within the earth. The seismic survey signal may then be reflected by a reflector inside the earth. The receiver 120 may receive the reflected signals from the geological formation in a conventional manner. The receiver 120 may then generate data representative of the reflections including the seismic data embedded in electromagnetic signals. The electromagnetic signals may be electrical or optical. The seismic survey signals and the reflections may be comprised of what are known as "body waves," or waves that propagate into the geological formation of the earth. Body waves may comprise what are more technically known as pressure waves ("P-waves") and shear waves ("S-waves").

In addition to the body waves, the source 110 may also generate interface waves, i.e., the ground roll. Note that, in a seabed or ocean bottom survey, the interface waves are Scholte waves. Ground roll propagates, as mentioned above, at the interface between two media, as opposed to through a medium, e.g., layers of the earth. The ground roll may propagate at the interface between the geological formation and the air. The ground roll may then be acquired by receiver 120 along with the body waves. Thus, the data acquired by receiver 120 may also include ground roll data along with body wave data, which may be undesirable. In one implementation, there may be many sources for the ground roll aside from controlled sources like the source 110. As shown in FIG. 1, receiver 120 and source 110 may be positioned inside a circle formed by boundary receivers 130.

Figure 2:
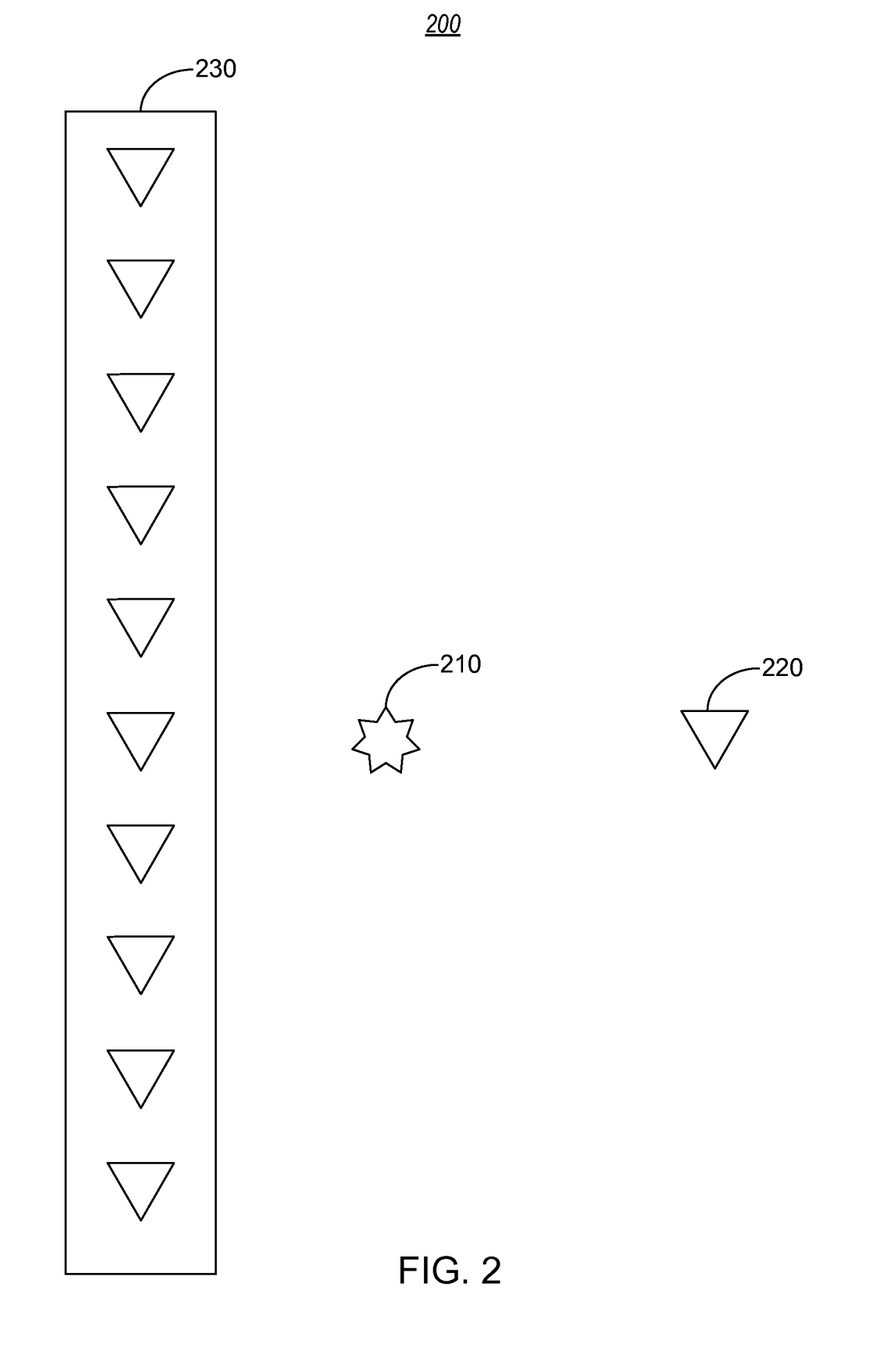

FIG. 2 illustrates a schematic diagram of a source and receiver configuration 200 in accordance with implementations of various techniques described herein. The source and receiver configuration 200 includes a source 210, a receiver 220 and boundary receivers 230. The source 210, receiver 220 and boundary receivers 230 may correspond to the descriptions of source 110, receiver 120 and boundary receivers 130, respectively. Like the source and receiver configuration 100, it should be noted that the methods described herein may also be applied to a source and receiver configuration having boundary sources at boundary receiver 230 locations, a source at receiver 220 location, and a receiver at source 210 location according to source-receiver reciprocity.

Figure 3:
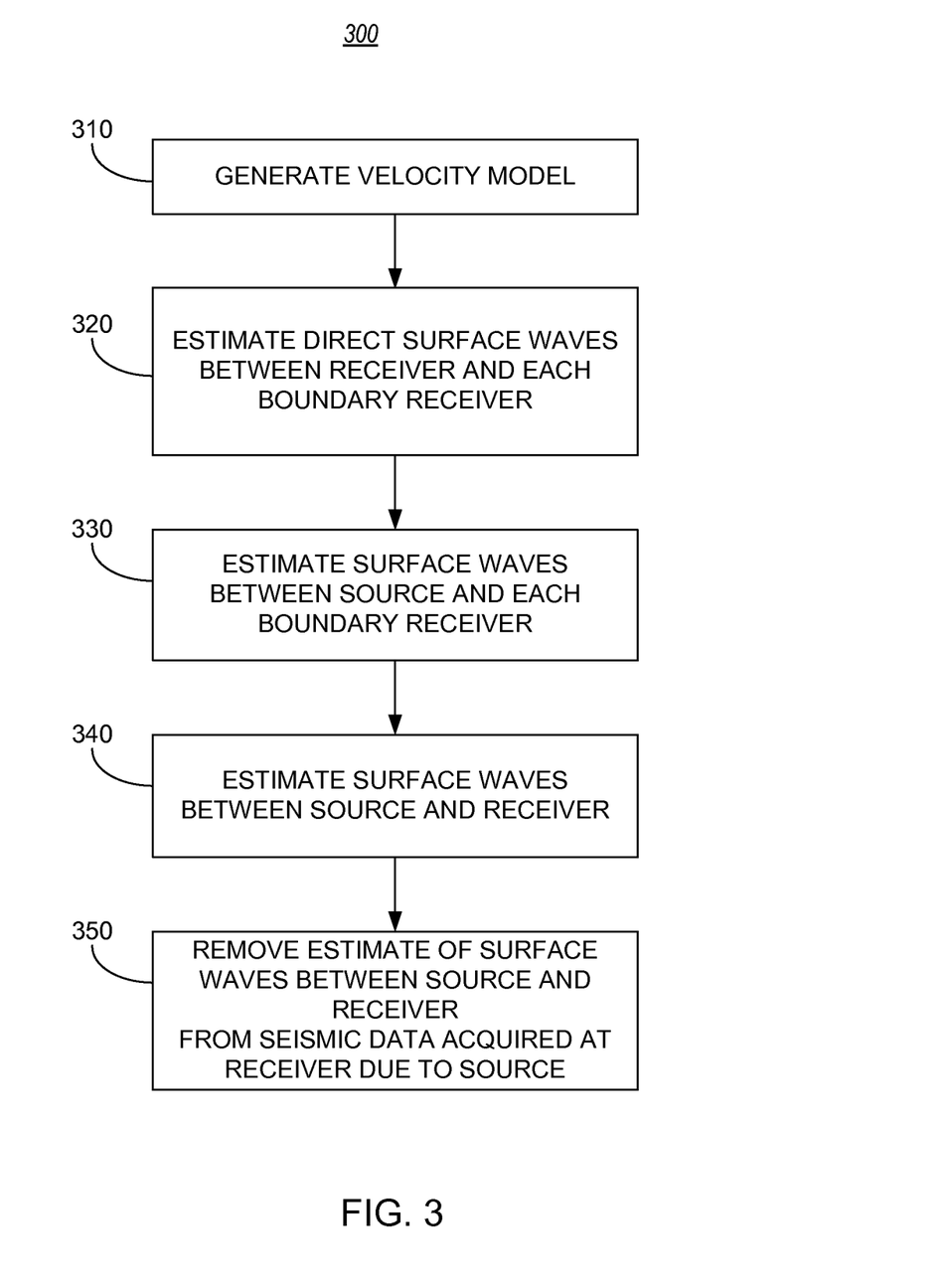
FIG. 3 illustrates a flow diagram of a method for removing ground roll from seismic data in accordance with one or more implementations of various techniques described herein.

FIG. 3 illustrates a flow diagram of a method 300 for removing ground roll from seismic data in accordance with one or more implementations of various techniques described herein. In one implementation, the method for removing ground roll from seismic data may be performed by a computer application. It should be understood that while the flow diagram indicates a particular order of execution of the operations, in some implementations, certain portions of the operations might be executed in a different order. For purposes of discussing method 300, the following steps of method 300 will be described with reference to the source and receiver configuration 100 of FIG. 1. However, method 300 is not limited to the source and receiver configuration of FIG. 1; instead it should be understood that method 300 may be used in a variety of source and receiver configurations.

Generally, the seismic data acquired by receivers 120 in source-receiver configuration 100 may include a seismic wavefield that is composed of three parts: (1) the direct ground roll that propagate between source and receiver locations unaffected by near-surface heterogeneity; (2) the scattered ground roll that propagates between source and receiver locations via near-surface heterogeneities; and (3) the body waves that propagate between source and receiver locations, including reflected waves, multiple reflections, diffractions, refracted waves, and the like. As such, method 300, described herein, may be used to isolate the body waves in (3) by eliminating the contribution of the direct ground roll in (1) and the scattered ground roll in (2). While the separation of the waves in the direct ground roll in (1) from the scattered ground roll in (2) and the body waves in (3) can be achieved using conventional processing techniques, the separation of the scattered ground roll in (2) from the body waves in (3) may not be straightforward.

Conventional processing techniques can be used to make simple estimates of the ground roll in (1) and (2) by band-pass filtering the seismic data, and muting any early arrivals that can be identified as not being ground roll. While this result contains those body waves in (3), this is an appropriate guess of the ground roll for the application of interferometry to create an interferometric estimate of the ground roll. Conventional approaches to interferometric ground-roll remove simple estimates of the waves in (1) and (2) to create an estimate of the ground roll that is used to isolate the body waves in (3) by adaptively subtracting the estimates from the seismic data. Method 300, as described below, may replace the direct waves in (1), used as an input to interferometric processing techniques, with waves modeled using a simple forward modeling algorithm thereby making the separation of the waves in the ground roll in (1) and (2) from the body waves in (3) less complex and more straightforward than conventional processing techniques, which often only separate the waves in (1) and not those in (2).

At step 310, the computer application may generate a velocity model from the seismic data acquired at receiver 120 and boundary receivers 130. The seismic data may include the seismic data received at receiver 120 and boundary receivers 130 after source 110 has been actuated. Alternatively, the seismic data may include seismic data acquired at receiver 120 and boundary receivers 130 due to ambient sources within the earth. In any case, the velocity model may represent elastic properties of the near surface of the earth such as ground roll propagation velocities and the like. In one implementation, the computer application may generate the velocity model by extracting a velocity model from the seismic data received at receiver 120 and boundary receivers 130. Although the velocity model has been described as being generated using an extraction process, it should be noted that in other implementations the velocity model may be generated by studying geological maps, analyzing images from various types of satellite, and the like. Further, although method 300 is described using a velocity model, it should be understood that method 300 is not limited to velocity models; instead, any model representing elastic properties of the earth may be used in place of the velocity models used herein. Although method 300 is described herein as removing ground roll from seismic data using seismic data acquired at receivers, it should be understood that method 300 is not limited to only seismic data but may be used for other types of geophysical data.

At step 320, the computer application may apply a forward modeling algorithm using information from the velocity model to generate a modeled estimate of the direct ground roll between receiver 120 and each boundary receiver 130. Here, the computer application may apply the forward modeling algorithm to information extracted from the velocity model. In one implementation, if the seismic data has been received from a source and receiver configuration as shown in FIG. 2 (i.e., orthogonal array of receivers) or any other "open" geometry receiver configuration, the computer application may apply a weighting function to the modeled estimate of the direct ground roll between receiver 220 and each boundary receiver 230. The weighting function may suppress edge effects that may be present in the interferometric estimate of the direct and scattered ground roll between source 210 and receiver 220 determined at step 340 below due to the open geometry configuration of boundary receivers 230.

By obtaining the modeled estimate of the direct ground roll between receiver 120 and each boundary receiver 130 using a forward modeling algorithm, the computer application may be able to apply interferometry between a real source and a real receiver without a boundary of sources as typically used in traditional interferometric ground roll removal techniques. In one implementation, the estimate of the direct ground roll may be from a near-surface model, which may be a modeled estimate derived from Rayleigh-wave inversions, or any other near-surface characterization study In yet another implementation, the computer application may generate a velocity model, at step 310, by identifying properties of the direct ground roll within a particular window, such as the ground-roll propagation velocities, the amplitudes of the ground roll, and/or the frequency content of the ground roll. The computer application may then use an appropriately weighted plane wave model of the waves propagating between receiver 120 and boundary receivers 130 to determine the estimate of the direct ground roll between receiver 120 and each boundary receiver 130 using the forward modeling algorithm. By using an appropriately weighted plane wave model of the waves, it is understood that the plane waves are weighted by some factor. For example, these weights may be found from the amplitudes of the data, or by finding those weights that give the most desirable result. By using a plane wave model, the computer application may decrease the computational power needed to determine the estimate of the direct ground roll between receiver 120 and each boundary receiver 130 using the forward modeling algorithm.

In still another implementation, the computer application may use wavefield extrapolation operators, such as those used in seismic migration, to produce similar results to modeling the direct ground roll between receiver 120 and each boundary receiver 130.

At step 330, the computer application may make a simple estimate of the direct and scattered ground roll between source 110 and each boundary receiver 130. In one implementation, the direct and scattered ground roll may be estimated by processing the seismic data acquired at boundary receivers 130 due to source 110. The seismic data processing may include applying a band pass filter on the seismic data, analyzing the arrival times of the seismic data via time windowing, or the like.

In one implementation, if the seismic data has been acquired from a source and receiver configuration as shown in FIG. 2 (i.e., orthogonal array of receivers) or any other "open" geometry receiver configuration, the computer application may apply a spatial taper to the simple estimate of the direct and scattered ground roll between source 210 and each boundary receiver 230 to suppress edge effects in the interferometric estimate of the ground roll between source 210 and receiver 220 as determined at step 340 below. The edge effects may occur due to the open geometry configuration of the boundary receivers 230. It should be noted that step 330 is an optional step in method 300, and in some implementations the computer application may proceed to step 340 in lieu of step 330.

At step 340, the computer application may apply interferometry between the simple estimate of the direct and scattered ground roll between source 110 and each boundary receiver 130 obtained at step 330 and the modeled estimate of the direct ground roll between receiver 120 and each boundary receiver 130 obtained at step 320. In one implementation, the computer application may apply interferometry by cross correlating the simple estimate of the direct and scattered ground roll between source 110 and each boundary receiver 130 with the modeled estimate of the direct ground roll between receiver 120 and each boundary receiver 130. After cross correlating these two estimates, the computer application may then sum the results of the cross correlations together. As a result, the computer application may obtain an interferometric estimate of the direct and scattered ground roll between source 110 and receiver 120.

Although the interferometry performed in step 340 used a cross correlation technique, in other implementations the interferometry may be performed using a cross-convolution or a deconvolution technique depending on how source 110, receiver 120 and boundary receivers 130 are positioned with respect to each other. For instance, if receiver 120 is positioned outside the circle formed by boundary receivers 130 in source and receiver configuration 100, the computer application may perform interferometry on the estimates using a cross-convolution technique to obtain a more accurate interferometric estimate of the direct and scattered ground roll between source 110 and receiver 120.

In one implementation, in order to estimate all direct and scattered ground roll between source 110 and receiver 120, boundary receivers 130 should be arranged in a closed configuration as shown in FIG. 1. However, as mentioned above, if boundary receivers 130 are not in a closed configuration, the computer application may perform various processing steps (e.g., apply weighting function, apply spatial taper) at various steps in method 300 to compensate for edge effects that may be present in the interferometric estimate of the direct and scattered ground roll between source 110 and receiver 120 determined at step 340 due to the open geometry configuration of boundary receivers 130.

In still another implementation, method 300 may be configured to estimate just the direct ground roll between source 110 and receiver 120. In this case, after estimating the direct and scattered ground roll between source 110 and each boundary receiver 130 at step 330, the computer application may isolate the direct ground roll from the simple estimate of the direct and scattered ground roll between source 110 and each boundary receiver 130. As a result, at step 340, the computer application may apply interferometry between the simple estimate of the direct ground roll between source 110 and each boundary receiver 130 obtained at step 330 and the modeled estimate of the direct ground roll between receiver 120 and each boundary receiver 130 obtained at step 320 to obtain an interferometric estimate of the direct ground roll between source 110 and receiver 120 at step 340.

In still another implementation, method 300 may be configured to estimate just the scattered ground roll between source 110 and receiver 120. In this case, after estimating the direct and scattered ground roll between source 110 and each boundary receiver 130 at step 330, the computer application may isolate the scattered ground roll from the simple estimate of the direct and scattered ground roll between source 110 and each boundary receiver 130. As a result, at step 340, the computer application may apply interferometry between the simple estimate of the scattered ground roll between source 110 and each boundary receiver 130 obtained at step 330 and the modeled estimate of the direct ground roll between receiver 120 and each boundary receiver 130 obtained at step 320 to obtain an interferometric estimate of the scattered ground roll between source 110 and receiver 120 at step 340.

As mentioned above, step 330 is optional and the computer application may skip step 330 and proceed to step 340 from step 320. In this case, the computer application may apply interferometry between the seismic data between source 110 and each boundary receiver 130 (i.e., seismic data received at boundary receivers 130 due to source 110) and the modeled estimate of the direct ground roll between receiver 120 and each boundary receiver 130 obtained from step 320.

At step 350, the computer application may remove the interferometric estimate of the direct and scattered ground roll between source 110 and receiver 120 from the seismic data acquired at receiver 120 due to source 110. By removing the interferometric estimate of the direct and scattered ground roll between source 110 and receiver 120 from the seismic data acquired at receiver 120, the computer application may reduce or eliminate the ground roll from the seismic data acquired at receiver 120.

In one implementation, if the seismic data received at any of the receivers include two or more distinct ground roll modes that overlap in the frequency domain, the computer application may separate the ground roll modes prior to step 340 and then add their contributions to the estimated direct and scattered ground roll between source 110 and receiver 120 between steps 340 and 350.

Figure 4:
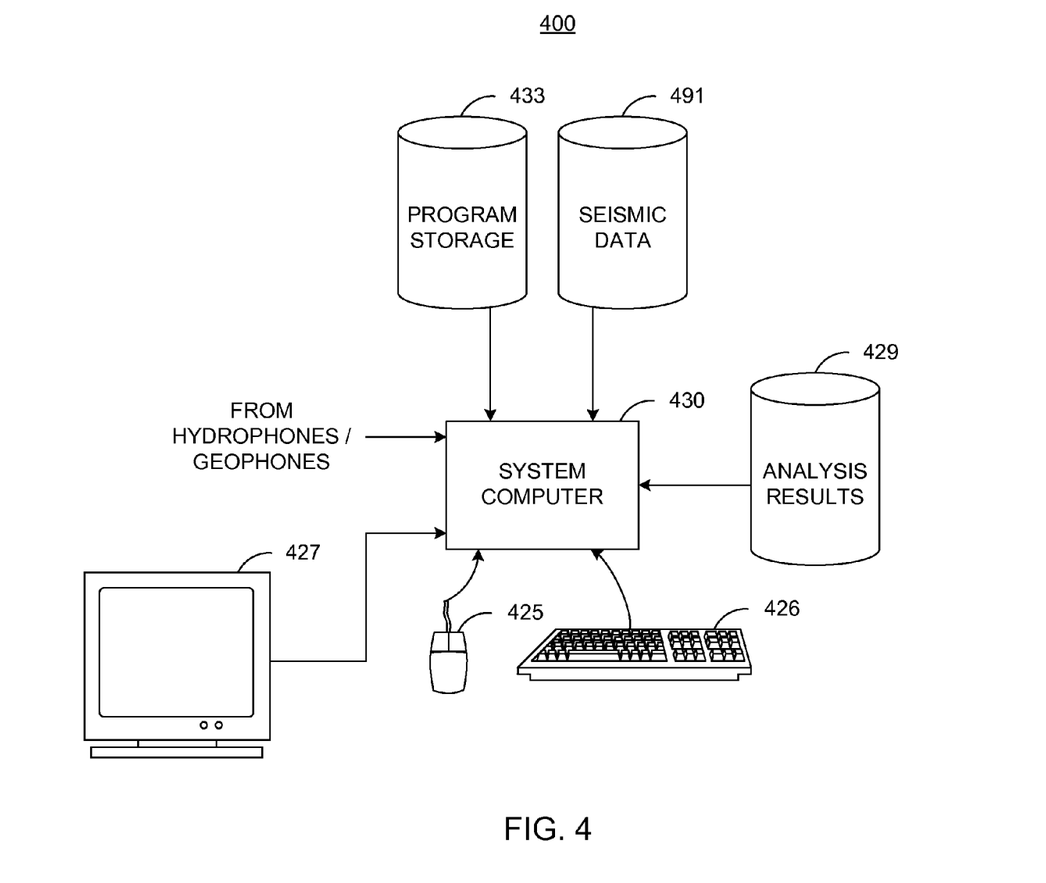
FIG. 4 illustrates a computer network into which implementations of various technologies described herein may be implemented.

FIG. 4 illustrates a computer network 400 into which implementations of various technologies described herein may be implemented. In one implementation, various techniques for determining the removing ground roll from seismic data as described in FIG. 3 may be performed on the computer network 400. The computer network 400 may include a system computer 430, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in method 300 may be stored on the system computer 430.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the receivers may be stored in disk storage device 431. The system computer 430 may retrieve the appropriate data from the disk storage device 431 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 433. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. After conventional formatting and other initial processing, these signals may be stored by the system computer 430 as digital data in the disk storage 431 for subsequent retrieval and processing in the manner described above. In one implementation, these signals and data may be sent to the system computer 430 directly from sensors, such as geophones, hydrophones and the like. When receiving data directly from the sensors, the system computer 430 may be described as part of an in-field data processing system. In another implementation, the system computer 430 may process seismic data already stored in the disk storage 431. When processing data stored in the disk storage 431, the system computer 430 may be described as part of a remote data processing center, separate from data acquisition. The system computer 430 may be configured to process data as part of the in-field data processing system, the remote data processing system or a combination thereof. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing geophysical data, comprising:
generating, by a computer, a model from geophysical data acquired at a receiver location and one or more boundary receiver locations;
applying a forward modeling algorithm using information from the model to generate an estimate of a ground roll between the receiver location and the boundary receiver locations;
generating a simple estimate of a ground roll between a source location and the boundary receiver locations;
applying interferometry between the simple estimate of the ground roll between the source location and the boundary receiver locations and the estimate of the ground roll between the receiver location and the boundary receiver locations to generate an interferometric estimate of a ground roll between the source location and the receiver location; and
removing the interferometric estimate of the ground roll between the source location and the receiver location from the geophysical data acquired at the receiver location.

2. The method of claim 1, wherein the model is a velocity model that represents one or more elastic properties of the near surface of the earth.

3. The method of claim 1, wherein applying the forward modeling algorithm comprises using a plane wave model of one or more waves propagating between the receiver location and the boundary receiver locations.

4. The method of claim 1, wherein applying the forward modeling algorithm comprises using a weighted plane wave model of one or more waves propagating between the receiver location and the boundary receiver locations.

5. The method of claim 1, wherein applying the forward modeling algorithm comprises using a wavefield extrapolation operator used in seismic migration.

6. The method of claim 1, wherein estimating the ground roll between the source location and the boundary receiver locations comprises applying a band pass filter on the geophysical data acquired at the boundary receiver locations due to a source at the source location.

7. The method of claim 1, wherein estimating the ground roll between the source location and the boundary receiver locations comprises—analyzing one or more arrival times of the geophysical data acquired at the boundary receiver locations due to a source at the source location via time windowing.

8. The method of claim 1, further comprising suppressing one or more edge effects in the estimate of the ground roll between the source location and the receiver location if the boundary receiver locations are arranged in an open geometry configuration.

9. The method of claim 8, wherein suppressing the edge effects comprises applying a weighting function to the estimate of the ground roll between the receiver location and the boundary receiver locations.

10. The method of claim 8, wherein suppressing the edge effects comprises applying a spatial taper to the estimate of the ground roll between the source location and the boundary receiver locations.

11. The method of claim 1, wherein applying the interferometry comprises:
cross correlating the estimate of the ground roll between the source location and the boundary receiver locations with the estimate of the ground roll between the receiver location and the boundary receiver locations; and
adding the cross correlations.

12. The method of claim 1, wherein applying the interferometry comprises:
cross convolving the simple estimate of the ground roll between the source location and the boundary receiver locations with the estimate of the ground roll between the receiver location and the boundary receiver locations; and
adding the cross convolutions.

13. The method of claim 1, wherein applying the interferometry comprises:
deconvolving the simple estimate of the ground roll between the source location and the boundary receiver locations with the estimate of the ground roll between the receiver location and the boundary receiver locations; and
adding the deconvolutions.

14. The method of claim 1, wherein the receiver location and the source location are inside a circle formed by the boundary receiver locations.

15. The method of claim 1, wherein the receiver location is outside a circle formed by the boundary receiver locations.

16. The method of claim 1, wherein the boundary receiver locations are arranged in an open geometry configuration.

17. The method of claim 1, wherein generating the model comprises extracting a velocity model from the geophysical data acquired at the receiver location and the boundry receiver locations.

18. The method of claim 1, wherein the simple estimate of the ground roll between the source location and the boundary receiver locations is determined using frequency-wavenumber filtering, band-pass filtering, time windowing or combinations thereof.

19. The method of claim 1, wherein the simple estimate of the ground roll between the source location and the boundary receiver locations and the interferometric estimate of the ground roll between the source location and the receiver location are scattered ground roll estimates.

20. The method of claim 19, wherein estimating the scattered ground roll between the source location and the boundary receiver locations comprises isolating a scattered ground roll from an estimate of a ground roll between the source location and the boundary receiver locations.

21. The method of claim 1, wherein the estimate of the ground roll between the source location and the boundary receiver location and the interferometric estimate of the ground roll between the source location and the receiver location are direct ground roll estimates.

22. The method of claim 21, wherein estimating the direct ground roll between the source location and the boundary receiver locations comprises isolating a direct ground roll from an estimate of a ground roll between the source location and the boundary receiver locations.

23. The method of claim 21, wherein applying the interferometry comprises:
cross correlating the simple estimate of the ground roll between the source location and the boundary receiver locations with the estimate of the direct ground roll between the receiver location and the boundary receiver locations when the receiver location and the source location are inside a circle formed by the boundary receiver locations; and
adding the cross correlations.

24. The method of claim 21, wherein applying the interferometry comprises:
cross convoluting the simple estimate of the ground roll between the source location and the boundary receiver locations with the estimate of the direct ground roll between the receiver location and the boundary receiver locations when the receiver location is outside a circle formed by the boundary receiver locations; and
adding the cross convolutions.

25. The method of claim 1, wherein the ground roll in the estimate of the ground roll between the receiver location and the boundary receiver locations is a direct ground roll.

26. The method of claim 1, wherein the geophysical data acquired at the receiver location are due to a source at the source location.

27. A method for processing geophysical data, comprising:
generating, by a computer, a model from geophysical data acquired at one or more receiver locations;
applying a forward modeling algorithm using information from the model to generate an estimate of a ground roll between a source location and one or more boundary source locations;
generating one or more simple estimates of one or more ground rolls between one of the receiver locations and the boundary source locations;
applying interferometry between the simple estimates of the ground rolls between the one of the receiver locations and the boundary source locations and the estimate of the ground roll between the source location and the boundary source locations to generate an interferometric estimate of a ground roll between the source location and the one of the receiver locations; and removing the interferometric estimate of the ground roll between the source location and the one of the receiver locations from the geophysical data acquired at the receiver locations.

28. The method of claim 27, wherein applying the forward modeling algorithm comprises using a plane wave model of one or more waves propagating between the source location and the boundary source locations.

29. The method of claim 27, wherein applying the forward modeling algorithm comprises using a weighted plane wave model of one or more waves propagating between the source location and the boundary source locations.

30. The method of claim 27, wherein applying the interferometry comprises:
cross correlating the estimate of the ground rolls between the one of the receiver locations and the boundary source locations with the estimate of the ground roll between the source location and the boundary source locations; and
adding the cross correlations.

31. The method of claim 27, wherein applying the interferometry comprises:
cross convolving the estimate of the ground rolls between the one of the receiver locations and the boundary source locations with the estimate of the ground roll between the source location and the boundary source locations; and
adding the cross convolutions.

32. The method of claim 27, wherein applying the interferometry comprises:
deconvolving the estimate of the ground rolls between the one of the receiver locations and the boundary source locations with the estimate of the ground roll between the source location and the boundary source locations; and
adding the deconvolutions.

33. The method of claim 27, wherein the one of the receiver locations and the source location are inside a circle formed by the boundary source locations.

34. The method of claim 27, wherein the one of the receiver locations is outside a circle formed by the boundary source locations.

35. The method of claim 27, wherein the boundary source locations are arranged in an open geometry configuration.

* * * * *